United States Patent

Gulbins et al.

[11] Patent Number: 5,470,899
[45] Date of Patent: Nov. 28, 1995

[54] REDUCTION IN THE PH OF ANIONIC POLYURETHANE DISPERSIONS WHICH ARE STABILIZED BY CARBOXYLATE OR SULFONATE GROUPS

[75] Inventors: Erich Gulbins, Heidelberg; Karl Haeberle, Speyer; Ulrike Licht, Mannheim; Alexander Wallon, Limburgerhof, all of Germany

[73] Assignee: BASF Aktiegesellschaft, Lugwigshafen, Germany

[21] Appl. No.: 174,283

[22] Filed: Dec. 28, 1993

[30] Foreign Application Priority Data

Jan. 7, 1993 [DE] Germany ............ 43 00 162.9

[51] Int. Cl.$^6$ ............ C08K 5/10; C08K 5/101; C08L 75/04

[52] U.S. Cl. ............ 524/158; 524/183; 524/306; 524/311; 524/315; 524/414; 524/417; 524/421; 524/422; 524/405; 524/429; 524/591; 524/773; 524/840

[58] Field of Search ............ 524/183, 158, 524/414, 429, 422, 421, 417, 405, 315, 311, 306, 773, 840, 591

[56] References Cited

U.S. PATENT DOCUMENTS

| 4,332,710 | 6/1982 | McCartney ............ 524/591 |
| 4,404,258 | 9/1983 | Loewrigkeit et al. ............ 525/453 |

FOREIGN PATENT DOCUMENTS

| 2645779 | 4/1978 | Germany . |
| 3310966 | 11/1983 | Germany . |
| 1584865 | 2/1981 | United Kingdom . |
| WO91/17196 | 11/1991 | WIPO . |

Primary Examiner—James J. Seidleck
Assistant Examiner—Rabon Sergent
Attorney, Agent, or Firm—Oblon, Spivak, McClelland, Maier & Neustadt

[57] ABSTRACT

A process for reducing the pH of anionic polyurethane dispersions which are stabilized by carboxylate or sulfonate groups, which comprises adding a compound which has from one to four ester groups but no acid group or acid halide or anhydride group to the dispersions.

3 Claims, No Drawings

REDUCTION IN THE PH OF ANIONIC POLYURETHANE DISPERSIONS WHICH ARE STABILIZED BY CARBOXYLATE OR SULFONATE GROUPS

The present invention relates to a process for reducing the pH of anionic polyurethane dispersions which are stabilized by carboxylate or sulfonate groups.

Aqueous polyurethane dispersions are increasingly being used, for ecological and economical reasons, for producing coatings with a decorative or corrosion-inhibiting effect. The polyurethanes employed particularly frequently for these purposes are dispersible in water owing to their content of carboxyl or sulfo groups. For the dispersion in water, the acid groups are neutralized, for example with tertiary amines or alkali metal ions, ie. converted into the corresponding anions.

Dispersions of this type are described, for example, in DE-A-26 45 779. However, the disadvantage of such dispersions is their pH, which is generally above 8 and usually in fact even higher. This high pH is particularly undesirable when aluminum pigments in the form of flakes are to be incorporated in the dispersion to achieve a decorative metallic effect because the aluminum dissolves outside the pH range from 7.0 to 7.5. Dissolution of the aluminum not only may cause the dispersion to coagulate but may also, owing to the evolution of hydrogen associated therewith, lead to a dangerous buildup of pressure in storage containers or processing machines.

It is not possible to reduce the pH by simply adding free acids because the high concentration of acid at the point of addition leads to coagulation of the dispersion.

DE-A-33 10 966 describes a method for producing polyurethane dispersions which afford low-yellowing coatings on PVC. According to this publication, the dispersions are mixed, for example, with acid halides or anhydrides, which results, although this is not mentioned, in a reduction in the pH. However, this process has serious disadvantages:

the handling of acid halides or anhydrides is, because of their reactivity, associated with considerable technical complexity and safety problems and the acid halides or anhydrides frequently contain the corresponding acids as impurity or they hydrolyze on contact with water so fast that their adverse effect on the dispersion is the same as that of the acids.

It is an object of the present invention to provide a process which permits the pH of a polyurethane dispersion which is stabilized with carboxylate or sulfonate groups to be adjusted to from 7.0 to 7.5 without using reactive chemicals such as acid halides or anhydrides.

We have found that this object is achieved by a process for reducing the pH of anionic polyurethane dispersions which are stabilized by carboxylate or sulfonate groups, which comprises adding a compound which has from one to four ester groups but no acid group or acid halide or anhydride group to the dispersions. We have also found a polyurethane dispersion which contains a compound which has from one to four ester groups but no acid group or acid halide or anhydride group, as well as the use of the polyurethane dispersion for coating.

Structural components of the polyurethane which should be mentioned are polyisocyanates (monomers I), preferably diisocyanates.

Particular mention should be made of diisocyanates $X(NCO)_2$ where X is an aliphatic hydrocarbon radical having 4–12 carbon atoms, a cycloaliphatic or aromatic hydrocarbon radical having 6–15 carbon atoms or an araliphatic hydrocarbon radical having 7–15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexylene diisocyanate, 1,4-diisocyanatobenzene, 2,4-diisocyanatotoluene, 2,6-diiisocyanatotoluene, bis(4-isocyanatophenyl)methane, p-xylylene diisocyanate and mixtures of these compounds.

It is also possible for the more highly functional polyisocyanates or modified polyisocyanates which are known in polyurethane chemistry, for example polyisocyanates which have carbodiimide, allophanate, isocyanurate, urethane and/or biuret groups, to be present, especially in the process disclosed in U.S. Pat. No. 4,507,431.

The other structural components of the polyurethane comprise, firstly, polyols with a molecular weight of 400–6,000 g/mol, preferably 600–4,000 g/mol (monomers II).

Particularly suitable are polyether polyols or polyester polyols.

The polyester diols comprise, in particular, the known products of the reaction of dihydric alcohols with dibasic carboxylic acids. In place of the free polycarboxylic acids it is also possible to use the corresponding anhydrides or corresponding esters of lower alcohols or mixtures thereof to prepare the polyester polyols. The polycarboxylic acids can be aliphatic, cycloaliphatic, aromatic or heterocyclic and may be substituted, e.g. by halogen atoms, and/or unsaturated. Examples are: succinic acid, adipic acid, suberic acid, azelaic acid, sebacic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids. Examples of suitable dihydric alcohols are ethylene glycol, 1,2- and 1,3-propylene glycol, 1,4- and 1,3-butanediol, 1,4-butenediol, 1,4-butynediol, 1,5-pentanediol, 1,6-hexanediol, 1,8-octanediol, neopentyl glycol, cyclohexanedimethanol (1,4-bishydroxymethylcyclohexane), 2-methyl-1,3-propanediol, 1,5-pentanediol, as well as diethylene glycol, triethylene glycol, tetraethylene glycol, polyethylene glycol, dipropylene glycol, polypropylene glycol, dibutylene glycol and polybutylene glycols. It is also possible for small amounts, ie. generally below 10 mol % based on the alcohols, of higher than difunctional alcohols, e.g. glycerol, trimethylolpropane or 1,2,6-hexanetriol, to be present.

Also suitable are lactone-based polyester diols, which are homo- or copolymers of lactones, preferably adducts having terminal hydroxyl groups of lactones or lactone mixtures, such as ε-caprolactone, β-propiolactone, γ-butyrolactone and/or methyl-ε-caprolactone, with suitable difunctional starter molecules, e.g. the low molecular weight dihydric alcohols mentioned above as structural components for the polyester polyols. The corresponding polymers of ε-caprolactone are particularly preferred. It is also possible to employ lower polyester diols or polyether diols as starters for preparing the lactone polymers. In place of the lactone polymers it is also possible to employ the chemically equivalent polycondensates of the hydroxy carboxylic acids corresponding to the lactones.

Suitable polyether diols, which may also be mixed with polyester diols, can be obtained, in particular, by homopolymerization of ethylene oxide, propylene oxide, butylene oxide, tetrahydrofuran, styrene oxide or epichlorohydrin, e.g. in the presence of $BF_3$, or by forming adducts of these compounds, possibly as mixtures or successively, with starter components having reactive hydrogen atoms such as alcohols or amines, e.g. water, ethylene glycol, 1,3- or 1,2-propylene glycol, bis(4-hydroxyphenyl)propane or aniline.

The proportion of the monomers II described above is generally from 0.1 to 0.8 gram equivalent, preferably 0.2 to 0.7 gram equivalent, of hydroxyl in the monomer II based on isocyanate in the polyisocyanate.

Further structural components of the polyurethane comprise chain extenders or crosslinkers having at least two groups which react with isocyanate and are selected from hydroxyl and primary or secondary amino groups.

Mention must be made of polyols, especially diols and triols, having a molecular weight of from 400 g/mol to 62 g/mol (monomers III).

Particularly suitable are the diols and triols which are mentioned above as suitable for preparing the polyester polyols, as well as higher than trifunctional alcohols such as pentaerythritol or sorbitol.

The proportion of monomers III is generally 0–0.8, in particular 0–0.7, gram equivalent based on isocyanate.

The monomers IV which are to be employed where appropriate comprise at least difunctional amine chain extenders or crosslinkers in the molecular weight range from 32 to 500 g/mol, preferably from 60 to 300 g/mol, which contain at least two primary, two secondary or at least one primary and at least one secondary amino group.

Examples of these are diamines such as diaminoethane, diaminopropanes, diaminobutanes, diaminohexanes, piperazine, 2,5-dimethylpiperazine, 1-amino-3-aminomethyl-3,5, 5-trimethylcyclohexane (isophorone diamine, IPDA), bis(4-aminocyclohexyl)methane, 1,4-diaminocyclohexane, aminoethylethanolamine, hydrazine, hydrazine hydrate or triamines such as diethylenetriamine or 1,8-diamino- 4-aminomethyloctane. The amino-containing chain extenders may also be employed in blocked form, e.g. in the form of the corresponding ketimines (see, for example, CA-1 129 128), ketazines (cf., for example, U.S. Pat. No. 4,269,748) or amine salts (see U.S. Pat. No. 4,292,226). Oxazolidines as used, for example, in U.S. Pat. No. 4,192,937 also represent capped polyamines which can be employed for chain extension of the prepolymers for preparing the polyurethanes according to the invention. When such capped polyamines are used they are generally mixed with the prepolymers in the absence of water, and this mixture is subsequently mixed with the dispersing water or a part thereof so that intermediate hydrolysis liberates the corresponding polyamines.

Mixtures of di- and triamines are preferably used, particularly preferably mixtures of isophorone diamine and diethylenetriamine.

The monomers V which are likewise to be employed where appropriate as chain extenders comprise amino alcohols having one hydroxyl group and one primary or secondary amino group such as ethanolamine, isopropanolamine, methylethanolamine or aminoethoxyethanol.

The proportion of monomers IV or V is preferably in each case from 0 to 0.4, particularly preferably from 0 to 0.2, gram equivalent based on isocyanate in the polyisocyanate.

Further structural components employed are compounds which have at least one, preferably two, groups which react with isocyanates, ie. hydroxyl, primary or secondary amino groups, and furthermore, in contrast to the monomers described previously, contain carboxyl or sulfo groups or their anions (monomers VI). The introduction of the monomers VI makes the polyurethanes selfdispersible, ie. on dispersion in water no dispersion aids such as protective colloids or emulsifiers are required in this case.

Examples of preferred monomers VI are diamino sulfonates such as sodium N-(2-aminoethyl)-2-aminoethane sulfonate, dihydroxy sulfonates, dihydroxy carboxylic acids such as dimethylolpropionic acid, diamino carboxylic acids or carboxylates such as lysine or sodium N-(2-aminoethyl)-2-aminoethanecarboxylate.

The monomers VI particularly preferably contain a carboxyl group or the anion thereof.

Very particularly preferred are diamino and dihydroxy carboxylic acids, especially the adduct of ethylenediamine and sodium acrylate or dimethylolpropionic acid.

This neutralization can take place before, during or, preferably, after the isocyanate polyaddition.

The amounts of the monomers VI are suitably chosen so that the sulfonate or carboxylate group content of the polyurethanes is from 0.05 to 2 meq/g of polyurethane, preferably from 0.07 to 1.0 and particularly preferably from 0.1 to 0.7 meq/g of polyurethane.

Monofunctional amino or hydroxy compounds may also be used as structural components (monomers VII). These preferably comprise monohydric polyether alcohols in the molecular weight range from 500 to 10,000 g/mol, preferably from 800 to 5,000 g/mol. Monohydric polyether alcohols can be obtained, for example, by alkoxylation of monohydric starter molecules such as methanol, ethanol or n-butanol, employing as alkoxylating agent ethylene oxide or mixtures of ethylene oxide with other alkylene oxides, especially propylene oxide. However, when alkylene oxide mixtures are used they preferably contain at least 40, particularly preferably at least 65, mol % of ethylene oxide.

It is thus possible to incorporate in the polyurethanes by means of the monomers VII polyethylene oxide segments which may be present in terminal polyether chains and which, besides the ionic groups, influence the hydrophilic character of the polyurethane and ensure or improve its dispersibility in water.

The compounds of the said type are, if used, preferably employed in amounts such that the polyurethane contains from 0 to 10, preferably from 0 to 5, % by weight of polyethylene oxide units.

Other examples of compounds which can be employed as monomers I to VII for preparing the polyurethane are described, for example, in High Polymers, Vol. XVI, "Polyurethanes, Chemistry and Technology", by Saunders-Frisch, Interscience Publishers, New York, London, Volume I, 1962, pages 32 to 42 and pages 44 to 54 and Volume II, pages 5 to 6 and 198 to 199.

Examples of suitable monomers VIII which, in contrast to the previous monomers, contain ethylenically unsaturated groups are esters of acrylic or methacrylic acid with polyols, with at least one OH group of the polyol remaining unesterified. Particularly suitable are hydroxyalkyl (meth)acrylates $HO(CH_2)_n OOC(R^1)C=CH_2$ (n=2–8; $R^1$=H or $CH_3$) and their positional isomers, mono(meth)acrylic esters of polyether diols, e.g. as listed for monomers II, trimethylolpropane mono- and di(meth)acrylate, pentaerythritol di- and tri(meth)acrylate or the products of the reaction of epoxy compounds with (meth)acrylic acid as disclosed, for example, in U.S. Pat. No. 357 221. The adducts of (meth)acrylic acid and bisglycidyl ethers of diols such as bisphenol A or butanediol are particularly suitable.

It is also possible to use adducts of (meth)acrylic acid and epoxidized diolefins such as 3,4-epoxycyclohexylmethyl 3,4-epoxycyclohexanecarboxylate.

The incorporation of monomers VIII makes it possible, if required, for the polyurethane to be cured thermally or photochemically, in the presence or absence of an initiator, after the coating has been applied.

The proportion of ethylenically unsaturated groups is generally below 0.2 mol per 100 g of polyurethane.

Overall, the proportions of the structural components are preferably chosen so that the total of the hydroxyl and primary or secondary amino groups which react with isocyanate is from 0.9 to 1.2, particularly preferably from 0.95 to 1.1, per isocyanate group.

The polyurethane dispersions can be produced by conventional methods as described, for example, in the publications detailed above.

Preferably, if VI contains no amino groups, the polyurethane or, if a further reaction with amino-functional monomers IV or VI is intended, a polyurethane prepolymer which still has terminal isocyanate groups is prepared in an inert water-miscible solvent such as acetone, tetrahydrofuran, methyl ethyl ketone or N-methylpyrrolidone from the monomers I and II, with or without III, V, VI, VII and VIII.

The reaction is generally carried out at from 20 to 160, preferably from 50° to 100° C.

To increase the rate of the reaction of the diisocyanates it is possible to use conventional catalysts such as dibutyltin dilaurate, tin(II) octoate or diazabicyclo[2.2.2]octane.

The resulting polyurethane prepolymer can, with or without (further) dilution with solvents of the abovementioned type, preferably with solvents boiling below 100° C., be further reacted with amino-functional compounds of the monomers VI and, where appropriate, IV at from 20° to 80° C.

The conversion of carboxyl or sulfo groups introduced into the polyurethane with the monomers VI into the corresponding ions takes place by neutralizing with bases before or during the dispersion of the polyurethane in water.

Mention may be made of organic or inorganic bases such as alkali metal hydroxides, carbonates or bicarbonates, ammonia or primary, secondary and, particularly preferably, tertiary amines such as triethylamine or dimethylaminopropanol.

After the dispersion it is possible to remove the organic solvent by distillation if its boiling point is below that of water. Any solvents with a higher boiling point which are used can remain in the dispersion.

The polyurethane content in the dispersions can be, in particular, from 5 to 70%, preferably from 20 to 50% of the weight of the dispersions.

Owing to the content of acid groups neutralized with bases, the pH of the dispersions is generally above 8.

The pH can be reduced by adding compounds with from one to four, preferably one or two, particularly preferably one, ester group (called esters hereinafter) without damaging the dispersion. The esters contain no acid, acid halide or anhydride group.

Particularly suitable are compounds with a molecular weight below 500 g/mol.

Examples which may be mentioned are esters of inorganic acids such as hydrochloric, sulfuric, nitric, boric or phosphoric acid.

Preferably employed are esters of organic acids of the formula

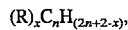

where n is an integer from 1 to 8, x is an integer from 1 to 4 and R is —COOH, —SO$_3$H, —P(OH)$_2$ or —PO(OH)$_2$.

Suitable acids are not only saturated aliphatic but also unsaturated aliphatic acids such as maleic acid or fumaric acid as well as aromatic acids such as benzoic acid.

The acids can also contain, for example, hydroxyl or keto groups or halogen atoms as substituents.

Examples of very suitable alcohol components in the esters are diols or monoalcohols with up to 6 carbon atoms. Also suitable are intramolecular esters, e.g. of hydroxy carboxylic acids.

Examples of esters are the methyl or ethyl esters of formic, acetic, oxalic, malonic, adipic or toluenesulfonic acid or gammabutyrolactone.

The amount of the esters added to the polyurethane dispersion is generally from 0.01 to 10 mol, preferably 0.05 to 2 mol, of ester groups per 1,000 g of polyurethane. The amount of the ester added is such that the pH does not fall below 6 after addition of the esters. In particular, the pH should be from 7 to 7.5 after the addition.

The exact amount of ester necessary to adjust the desired pH can also be determined, for example, in preliminary tests.

The ester is simply stirred into the polyurethane dispersion, and the final pH is set up within, in general, 1–24 hours. The final pH is set up particularly quickly with methyl esters. The setting up of the pH can also be made faster where appropriate by increasing the temperature to, for example 30°–60° C.

The volatile products of the ester cleavage can either remain in the dispersion or be removed by distillation. A particularly favorable embodiment in the case of dispersions which have been prepared using a volatile solvent such as acetone (see above) comprises adding the ester before the distillation and removing the products of ester cleavage together with the volatile solvent by distillation.

Aids, for example thickeners, thixotropy agents, oxidation and UV stabilizers, release agents, fillers or pigments, can be added to the polyurethane dispersions obtained.

The dispersions according to the invention can be used to produce coatings, e.g. paints or protective coatings, or as adhesives and may contain other ingredients customary for the particular use.

EXAMPLE

The amounts of ethyl acetate indicated in the table were added to 20 g of a 38% by weight polyurethane dispersion with a carboxylate content of 0.53 mol/kg of solids. The dispersion was then stored at 22° C.

TABLE

| pH change after addition of ethyl acetate | | | | |
|---|---|---|---|---|
| | amount of ethyl acetate added [g] | | | |
| Time (h) | 0 | 0.5 | 1.0 | 2.0 |
| 0 | 8.75 | 8.77 | 8.77 | 8.77 |
| 1 | 8.78 | 8.75 | 8.78 | 8.73 |
| 2 | 8.81 | 8.45 | 8.27 | 8.12 |
| 4 | 8.77 | 7.96 | 7.77 | 7.63 |
| 6 | 8.75 | 7.84 | 7.61 | 7.50 |
| 8 | 8.68 | 7.67 | 7.46 | 7.24 |
| 12 | 8.75 | 7.60 | 7.38 | 7.24 |
| 24 | 8.78 | 7.48 | 7.29 | 7.19 |
| 48 | 8.75 | 7.47 | 7.30 | 7.18 |

We claim:
1. A process for reducing the pH of anionic polyurethane dispersions which are stabilized by carboxylate or sulfonate groups to a pH of ≧6, which comprises adding a compound which has from 1 to 4 ester groups, but no acid group or acid halide or anhydride group to the dispersions,
   wherein said compound is an ester produced from the reaction of an inorganic acid or an organic acid selected from the group consisting of acids having the formula

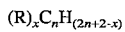

wherein n is an integer from 1 to 8, x is an integer from 1 to 4, and R is —COOH, —SO$_3$H, —P(OH)$_2$ or —PO(OH)$_2$;

with a monoalcohol having 1 to 6 carbon atoms.

2. A polyurethane dispersion obtained by a process as claimed in claim 1.

3. A process for reducing the pH of anionic polyurethane dispersions which are stabilized by carboxylate or sulfonate groups to a pH of $\geq 6$, which comprises adding a compound which has from 1 to 4 ester groups but no acid group or acid halide or anhydride group to the dispersions, wherein said compound is a member selected from the group consisting of esters produced from the reaction of formic, acetic, oxalic, malonic, adipic or toluenesulfonic acids with methanol or ethanol.

* * * * *